US011107235B1

(12) United States Patent
Connell et al.

(10) Patent No.: US 11,107,235 B1
(45) Date of Patent: Aug. 31, 2021

(54) SYSTEMS AND METHODS FOR IDENTIFYING DATA SUITABLE FOR MAPPING

(71) Applicant: HERE Global B.V., Eindhoven (NL)

(72) Inventors: Jeff Connell, Walnut Creek, CA (US); Anish Mittal, San Francisco, CA (US); David Johnston Lawlor, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/803,434

(22) Filed: Feb. 27, 2020

(51) Int. Cl.
  *G06K 9/00* (2006.01)
  *G06T 7/70* (2017.01)
  *G06F 16/29* (2019.01)
  *G06F 16/587* (2019.01)

(52) U.S. Cl.
  CPC ............... *G06T 7/70* (2017.01); *G06F 16/29* (2019.01); *G06F 16/587* (2019.01); *G06T 2207/20081* (2013.01); *G06T 2207/30244* (2013.01)

(58) Field of Classification Search
  CPC .......... G06T 7/70; G06F 16/587; G06F 16/29
  USPC ....................................................... 382/106
  See application file for complete search history.

(56) References Cited

U.S. PATENT DOCUMENTS

| 7,660,441 | B2 | 2/2010 | Chen et al. |
| 9,779,509 | B2 | 10/2017 | Martini |
| 9,916,689 | B2 | 3/2018 | Rhee et al. |
| 10,088,294 | B2 | 10/2018 | Moteki et al. |
| 2012/0063668 | A1 | 3/2012 | Zalmanson |
| 2017/0084037 | A1* | 3/2017 | Barajas Hernandez ..... G06K 9/00637 |
| 2017/0314934 | A1* | 11/2017 | Averbuch ............... G01C 21/30 |
| 2019/0317239 | A1* | 10/2019 | Olsson ................... G01C 21/32 |

\* cited by examiner

*Primary Examiner* — Stephen P Coleman
(74) *Attorney, Agent, or Firm* — Ion C. Moraru

(57) ABSTRACT

Systems and methods for identifying data suitable for mapping are provided. In some aspects, the method includes receiving one or more images acquired in an area of interest, and selecting at least two ground control points within a field of view of the one or more images. The method also includes determining perceived locations for the at least two ground control points using the one or more images, and computing pairwise distances between the perceived locations and predetermined locations of the at least two ground control points. The method further includes comparing corresponding pairwise distances to identify differences therebetween, and determining a suitability of the one or more images for mapping based on the comparison.

20 Claims, 8 Drawing Sheets

SYSTEMS AND METHODS FOR IDENTIFYING DATA SUITABLE FOR MAPPING

BACKGROUND

The present disclosure relates generally to mapping applications and services, and more specifically to systems and methods for identifying data suitable for mapping.

Developments in machine learning, computer vision, and processing power have allowed many advanced technologies, like autonomous driving, to quickly become a reality. However, as perceptual and computational abilities have improved, so too has the need for more accurate, up-to-date and detailed digital mapping data. For example, autonomous vehicles are envisioned to perform driving functions in very complicated urban environments. This would require complex path planning and high-accuracy information about vehicle surroundings (e.g. centimeter-level or better). In addition, knowledge about what to expect beyond a vehicle's perceptual horizon (e.g. objects not directly visible) would also be necessary to reliably obey driving rules and avoid collisions.

Map content providers often assemble digital maps using data from multiple sources in order to achieve the accuracy needed for mapping services and applications, such as autonomous driving. In particular, terrestrial data is commonly captured using surveying vehicles equipped with a number of sensors, such as cameras, global positioning system (GPS) sensors, inertia monitoring units (IMUs), light detection and ranging (LIDAR) sensors, depth sensors, and so forth. Such data is often subject to a number of errors. For example, GPS signals can become distorted in complicated urban environments, which can lead to localization errors of up to 30 meters. Although other sensors could be used to improve localization (e.g. by accounting for vehicle movement using IMUs), sensor data can drift and be insufficient for required accuracies of localization.

Accordingly, map content providers face significant technical challenges and need improved approaches for use in mapping services and applications.

SUMMARY

The present disclosure overcome the shortcomings of prior technologies. In particular, a novel approach for identifying data suitable for mapping is provided, as detailed below.

In accordance with one aspect of the disclosure, a method for identifying data suitable for mapping is provided. The method includes receiving one or more images acquired in an area of interest, and selecting at least two ground control points within a field of view of the one or more images. The method also includes determining perceived locations for the at least two ground control points using the one or more images, and computing pairwise distances between the perceived locations and predetermined locations of the at least two ground control points. The method further includes comparing corresponding pairwise distances to identify differences therebetween, and determining a suitability of the one or more images for mapping based on the comparison.

In accordance with another of the disclosure, a system for identifying data suitable for mapping is provided. The system includes at least one processor, and at least one memory comprising instructions executable by the at least one processor. The instructions cause the system to receive one or more images acquired in an area of interest, and select at least two ground control points within a field of view of the one or more images. The instructions also cause the system to determine perceived locations for the at least two ground control points using the one or more images, and compute pairwise distances between the perceived locations and predetermined locations of the at least two ground control points. The instructions further cause the system to compare corresponding pairwise distances to identify differences therebetween, and generate a report indicating a suitability of the one or more images for mapping that is determined based on the comparison. The system further includes a display for providing the report to a user.

In yet another aspect of the present disclosure, a non-transitory computer-readable medium for identifying data suitable for mapping, carrying one or more sequences of one or more instructions which, when executed by one or more processors, cause an apparatus to perform steps to receive one or more images acquired in an area of interest, and select at least two ground control points within a field of view of the one or more images. The instructions also cause the apparatus to determine perceived locations for the at least two ground control points using the one or more images, and compute pairwise distances between the perceived locations and predetermined locations of the at least two ground control points. The instructions further cause the apparatus to compare corresponding pairwise distances to identify differences therebetween, and determine a suitability of the one or more images for mapping based on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention will hereafter be described with reference to the accompanying figures, wherein like reference numerals denote like elements. The embodiments of the invention are illustrated by way of example, and not by way of limitation, in the accompanying drawings.

DETAILED DESCRIPTION

Content providers face significant challenges in producing mapping products and services. The mapping process can be labor-intensive and expensive, particularly for large-scale applications due to the efforts and resources required to acquire, process and store large datasets. This produces difficulties for conventional approaches because, absent some prior indication, data deficiencies or gaps are only discovered during post-processing, which requires costly follow-up and correction. Therefore, the present disclosure introduces a technical solution that addresses such problems. Specifically, systems and methods are provided herein that can be used to identify inadequate data, or a suitability of data for a specific application (e.g. mapping).

As appreciated from description herein, the present approach provides a number of advantages over previous methodologies. For instance, systems and methods herein may be used for automatic and scalable detection of inadequate data. This allows for timely data correction (e.g. real-time) and substantial cost savings. In addition, information and processes that rely on such data are improved. For instance, accurate mapping information is critical for a variety of mapping and map-making applications. This is because imprecision in mapping information could present safety hazards, reduce product reliability and consumer confidence. And so, in some aspects, the present approach may be used to identify a suitability of imaging, and possibly other data, to create relatively accurate maps.

In the following description, and for the purposes of explanation, numerous specific details are set forth to provide a thorough understanding of the embodiments of the invention. It should be apparent to one skilled in the art, however, that the embodiments of the invention may be practiced with or without these specific details, or with equivalent arrangements. In other instances, well-known structures and devices are shown in block diagram form in order to avoid unnecessarily obscuring the embodiments of the invention.

Figure 1:
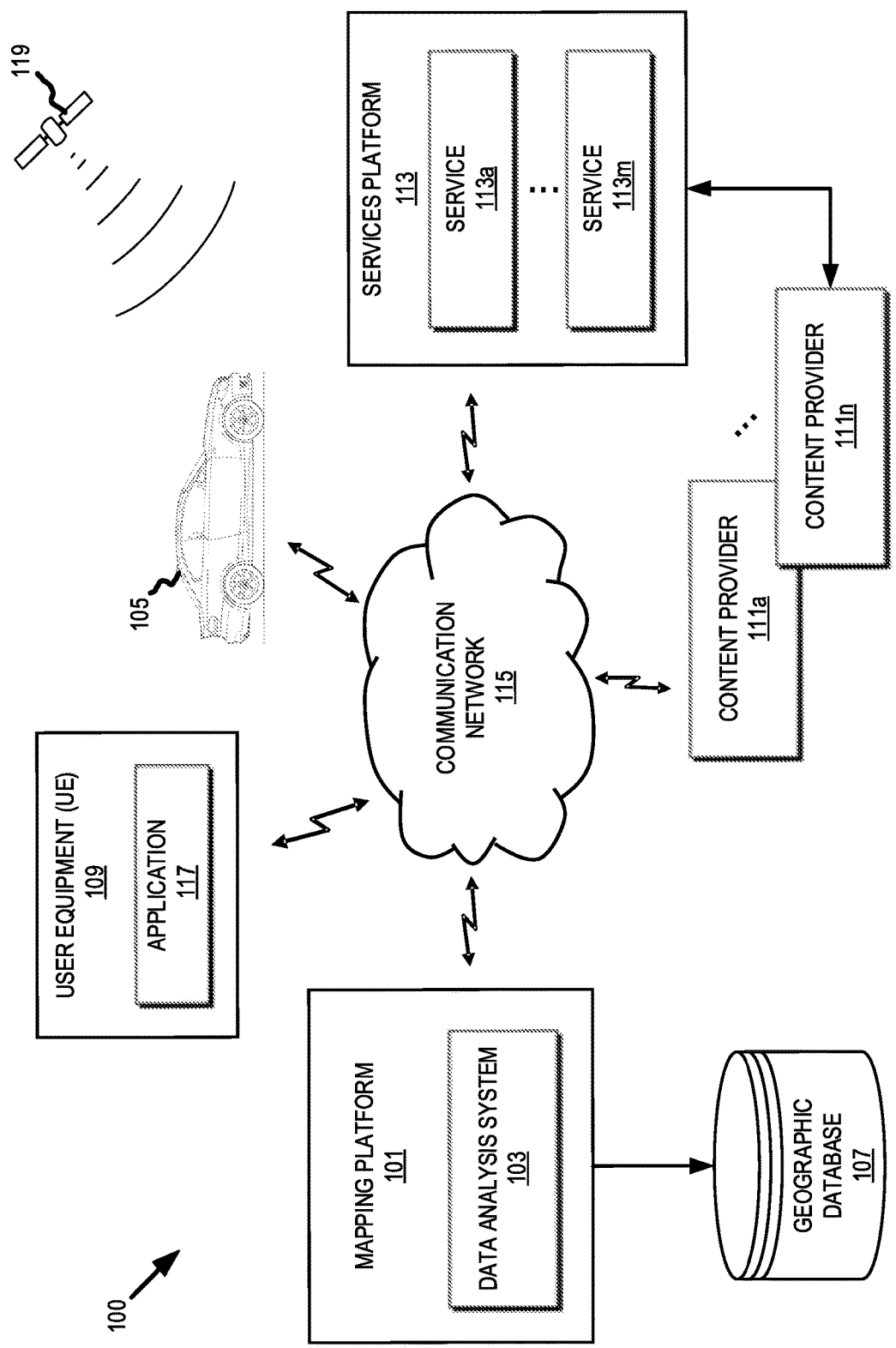
FIG. 1 is a diagram of an example system, in accordance with aspects of the present disclosure.

Referring particularly to FIG. 1, a schematic diagram of a system 100, in accordance with aspects of the present disclosure, is shown. In general, the system 100 may be any device, apparatus, system, or a combination thereof, that is configured to carry out steps in accordance with aspects of the present disclosure. Specifically, the system 100 may include, be part of, or operate in collaboration with, various computers, systems, devices, machines, mainframes, networks, servers, databases, and so forth. In some embodiments, the system 100 may also include portable or mobile terminals or devices, such as cellular phones, smartphones, laptops, tablets, and the like. In this regard, the system 100 may be designed to integrate a variety of hardware, software, and firmware with various capabilities and functionalities. In addition, the system 100 may be capable of operating autonomously or semi-autonomously.

In some embodiments, the system 100 may include a mapping platform 101 configured to generate and process a variety of mapping information and data, as well as carry out steps in accordance with aspects of the present disclosure. In addition, mapping platform 101 may also communicate and exchange information and data with a variety of other systems, devices and hardware. For instance, as shown in FIG. 1, the mapping platform 101 may communicate with one or more vehicle(s) 105, geographic database(s) 107, user equipment (UE) 109, content provider(s) 111, and/or services platform(s) 113 by way of a communication network 115.

To carry out processing steps, in accordance with aspects of the present disclosure, the mapping platform 101, and components therein, may execute instructions stored in a non-transitory computer-readable medium (not shown in FIG. 1). The non-transitory computer-readable medium may be part of a memory, database, or other data storage location(s). To execute the instructions, the mapping platform 101 may include, and/or utilize a programmable processor, or combination of programmable processors. Alternatively, or additionally, the mapping platform 101, and components therein, may also include and/or utilize one or more dedicated processors, or processing units, modules or systems specifically configured (e.g. hardwired, or pre-programmed) to carry out steps, in accordance with methods described herein. In addition, the mapping platform 101 may further include, and/or share, a variety of interconnected components, including servers, intelligent networking/computing devices and other components, as well as corresponding software and/or firmware. By way of example, processing steps may be carried out using any combination of central processing units (CPUs), graphics processing units (GPUs), Digital Signal Processing (DSP) chips, Application Specific Integrated Circuits (ASICs), Field Programmable Gate Arrays (FPGAs), and so forth.

In some embodiments, the mapping platform 101 may include a data analysis system 103, as illustrated in FIG. 1. The data analysis system 103 may be configured to perform a wide variety of processing and analysis steps, including for creating, verifying and updating mapping data and information. Although the data analysis system 103 is shown as being part of the mapping platform 101, the data analysis system 103 may be a stand-alone system. Alternatively, the data analysis system 103 may be a part of the vehicle 105, UE 109, services platform 113 or services 113a-m, or a combination thereof.

In some implementations, the data analysis system 103 may be configured to detect certain objects or features depicted in images, and utilize various algorithms (e.g. machine learning algorithms) implemented using various computing architectures. To this end, the data analysis system 103 may include one or more neural networks configured to make predictions based on various machine learning models. For example, the data analysis system 103 may include a neural network, such as a convolutional neural network, having multiple layers and neurons. Also, the data analysis system 103 may include receptive fields of a collection of neuron(s) (e.g., a receptive layer) configured to correspond to the area of interest in inputted imagery or data.

In some implementations, the data analysis system 103 may be configured to detect learnable features from imagery (e.g. top-down images, terrestrial images, and so forth), as well as identify various target points based on the features. For instance, such target points may include ground control points, as described below. The imagery can be obtained from a variety of different sources. For example, the imagery may be captured using aerial vehicles (e.g. airplanes, drones, and so forth), terrestrial vehicles (e.g. mapping vehicles, and the like), satellites, ground surveyors, device end-users, and using other equipment or methods. As described below, features are learnable if they can be used to effectively train a machine learning algorithm to make accurate predictions.

In some aspects, learnable features or target points can be marked or labeled in a large of set of training images. Labeling involves identifying pixels in imagery that correspond to desired points or features. Labeling may be performed automatically using various techniques, manually by a human labeler, a combination of both. The labeled training images may be used to train the machine learning algorithms to find target points or features in new imagery (i.e., predicting the pixel locations associated with points or features in the input images). In addition to generating data (e.g., location data) corresponding to detected points or features, the data analysis system 103 may also be configured to generate confidence values/uncertainties for the data (e.g. confidence or uncertainty in location).

In some implementations, the data analysis system 103 may be trained to automatically label imagery depicting areas to be mapped or analyzed. In addition, three-dimensional (3D) coordinates of target points or features can be estimated using multiple views, whereby corresponding points or features are labeled in two or more images (e.g. terrestrial, aerial, top-down and so forth). To this end, the mapping platform 101 and/or data analysis system 103 can determine pixel correspondences between various target points labeled in each of the images. The 3D coordinates can then be determined via a triangulation process from the pixel correspondences in combination with various device or camera information (e.g., model, position, pointing direction or pose, etc.) of device/camera used to capture the images. Since different sources (e.g., satellites, airplanes, drones, etc.) often provide imagery of different quality and resolution, and uncertainty/error associated with the generated target points may also be computed.

In some implementations, the data analysis system 103 may be configured to carry out steps to verify a quality of data and information (e.g. mapping data and information). In addition, the data analysis system 103 may be configured to identify inadequate data, or a suitability of data for a specific application (e.g. mapping), as detailed below.

Accurate positions of objects in the environment are critical for multiple services and applications, such as autonomous driving, transportation, guidance, search and rescue, and others. Ground paint features (e.g. painted lane markings and signs) and ground features (e.g. barriers), for example, can aid in lateral localization, while limit lines, signs and poles could help with longitudinal localization. Therefore, a map's ability to provide absolute positioning with high accuracy can be a good indicator of its quality. In addition, relative positioning between objects can also be highly useful for localization. That is, localization and other applications may also require that distances between mapped objects accurately correlate with those in the real world.

The concept of relative accuracy is distinct from absolute accuracy. To illustrate this distinction, suppose that a pole P is indicated on a 2D map to be at position $p_{map}$=(0, 5.0 meters), but its position measured in a survey is found at $p_{survey}$=(0, 5.3 meters). Assuming the pole's position is the only indicator of accuracy, then the absolute accuracy is 0.3 meters. However, suppose that the distance between two roadway signs, S1 and S2, is surveyed to be $d_{survey}$=10 meters. If the map distance between these signs is $d_{map}$=10.5 meters, then the relative accuracy is 0.5 meters. And so, absolute accuracy is based on differences between the position(s) of objects represented in a map, and their respective position(s) measured in the real world using a certain standard (e.g. a ground survey). By contrast, relative accuracy is based on differences between inter-object distances represented in the map and their respective distances measured in the real world (e.g. using a survey).

Therefore, in addition to verifying absolute positioning using imaging, the data analysis system 103 may also be configured to carry out steps for determining relative positioning of objects. In some aspects, the relative positioning may be used by the data analysis system 103 to identify a suitability of the imaging, and other data, to create relatively accurate maps. As will be described, this determination may be based on whether a relative positioning indicator exceeds a predetermined relative accuracy value or threshold.

Referring again to FIG. 1, the mapping platform 101 may have connectivity or access to a geographic database 107. Specifically, the geographic database 107 may store various geographical data and information in a variety of forms and formats. For instance, in one embodiment, the geographic database 107 may include images or image data (e.g. terrestrial, aerial, and so forth). The geographic database 107 may also include other geographical data and information, including representations of features and/or points (e.g. ground control points).

In addition, the mapping platform 101 may also communicate with UE 109 and/or a vehicle 105. In one embodiment, the UE 109, or alternatively the vehicle 105, may execute an application 117 (e.g. a software application) configured to carry out steps in accordance with methods described here. For instance, in one non-limiting example, the application 117 may carry out steps for capturing terrestrial data in an area of interest, determining and reporting a quality or suitability of captured data. In another non-limiting example, application 117 may also be any type of application that is executable on the UE 109 and/or vehicle 105, such as autonomous driving applications, mapping applications, location-based service applications, navigation applications, content provisioning services, camera/imaging application, media player applications, social networking applications, calendar applications, and the like. In yet another non-limiting example, the application 117 may act as a client for the data analysis system 103, and perform one or more functions associated with determining a quality of the terrestrial data captured, either alone or in combination with the data analysis system 103.

By way of example, the UE 109 may be, or include, an embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 may support any type of interface with a user (e.g. by way of various buttons, touch screens, consoles, displays, speakers, "wearable" circuitry, and other I/O elements or devices). Although shown in FIG. 1 as being separate from the vehicle 105, in some embodiments, the UE 109 may be integrated into, or part of, the vehicle 105.

In some embodiments, the UE 109 and/or vehicle 105 may include various sensors for acquiring a variety of different data or information. For instance, the UE 109 and/or vehicle 105 may include one or more camera/imaging devices for capturing imagery (e.g. terrestrial images), global positioning sensors (GPS) for gathering location or coordinates data, network detection sensors for detecting wireless signals, receivers for carrying out different short-range communications (e.g., Bluetooth, Wi-Fi, Li-Fi, near field communication (NFC) etc.), temporal information sensors, audio recorders for gathering audio data, velocity sensors, switch sensors for determining whether one or more vehicle switches are engaged, and others.

The UE 109 and/or vehicle 105 may also include light sensors, height sensors and accelerometers (e.g., for determining acceleration and vehicle orientation), tilt sensors (e.g. for detecting the degree of incline or decline), moisture sensors, pressure sensors, and so forth. Further, the UE 109 and/or vehicle 105 may also include sensors for detecting the relative distance of the vehicle 105 from a lane or roadway, the presence of other vehicles, pedestrians, traffic lights, potholes and any other objects, or a combination thereof. Other sensors may also be configured to detect weather data, traffic information, or a combination thereof. Yet other sensors may also be configured to determine the status of various control elements of the car, such as activation of wipers, use of a brake pedal, use of an acceleration pedal, angle of the steering wheel, activation of hazard lights, activation of head lights, and so forth.

In some embodiments, the UE 109 and/or vehicle 105 may include GPS or other satellite-based receivers configured to obtain geographic coordinates from a satellite 119 (FIG. 1) for determining current location and time. Further, the location can be determined by visual odometry, triangulation systems such as A-GPS, Cell of Origin, or other location extrapolation technologies.

The mapping platform 101 may also have connectivity with various content providers 111. Each content provider 111a-111n may send, or provide access to, various information or data to the data analysis system 103, vehicle 105, geographic database 107, user equipment 109, the services platform 113, and any combination thereof. The content provided may include map content (e.g., geographic data, parametric representations of mapped features, and so forth), textual content, audio content, video or image content (e.g. terrestrial image data), and so forth. In some implementations, the providers 111 may send, or provide access to, information or data for detecting and classifying lane lines and/or other features/target points in image data, and estimating the quality of the detected features. In some implementations, the providers 111 may also receive and store content from the data analysis system 103, vehicle 105, geographic database 107, UE 109, services platform 113, and any combination thereof. The content providers 111 may also manage access to a central repository of data, and offer a consistent, standard interface to data, such as a repository of the geographic database 107.

As shown in FIG. 1, the mapping platform 101 may further connect over the communication network 115 to the services platform 113 (e.g. a third-party platform), which may provide one or more services 113a-m. By way of example, the services platform 113 may provide mapping services, navigation services, travel planning services, notification services, social networking services, content (e.g., audio, video, images, etc.) provisioning services, application services, storage services, contextual information determination services, location based services, information based services (e.g., weather, news, etc.), and so forth. In one embodiment, the services platform 113 may use the output of the data analysis system 103 (e.g., ground control points, perceived locations of the ground control points, and so forth) to localize the vehicle 105 or UE 109 (e.g., a portable navigation device, smartphone, portable computer, tablet, etc.), and provide services such as navigation, mapping, other location-based services, and so forth.

The communication network 115 may include any number of networks, such as data networks, wireless networks, telephony networks, or combinations thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 101, data analysis system 103, vehicle 105, geographic database 107, UE 109, content provider 111, and services platform 1113 may communicate with each other, and other components of the system 100, using various communication protocols. In this context, a protocol may include a set of rules defining how the network nodes within the communication network 115 interact with each other based on information and data sent over the communication links. The protocols may be effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information and data over a network are described in the Open Systems Interconnection (OSI) Reference Model.

Communications between the network nodes may be carried out by exchanging discrete packets of data. Each packet may comprise (1) header information associated with a particular protocol, and (2) payload information that follows the header information and contains information that may be processed independently of that particular protocol. In some protocols, the packet may include (3) trailer information following the payload and indicating the end of the payload information. The header may include information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol is said to be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
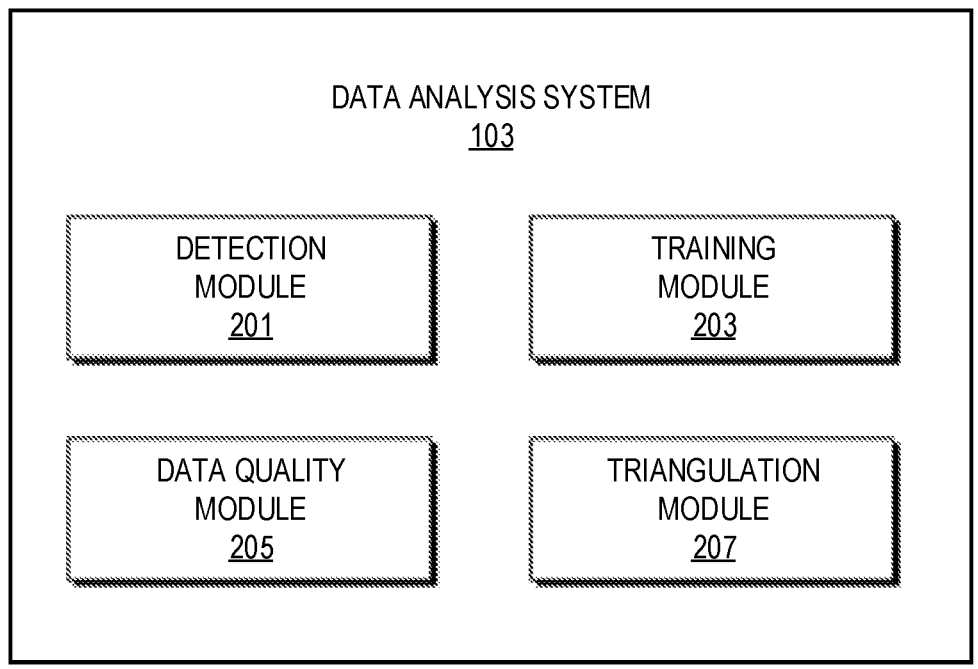
FIG. 2 is a diagram of an example data analysis system, in accordance with aspects of the present disclosure.

Referring now to FIG. 2, a schematic diagram of an example data analysis system 103, in accordance with aspects of the present disclosure, is illustrated. As shown, in some embodiments, the data analysis system 103 may include a detection module 201, a training module 203, a data quality module 205, and a triangulation module 207. The modules can be implemented using various hardware, firmware, software, as described with reference to the mapping platform 101 in FIG. 1. Alternatively, or additionally, modules may also be implemented as a cloud-based service, local service, native application, or combination thereof. Although the modules in FIG. 2 are shown as separate components of the data analysis system 103, it is contemplated that their respective functions may be readily combined into fewer modules, or further separated into more modules.

The detection module 201 may be configured to carry out a detection process to identify and/or select target points or features in images, for instance, captured using stationary or mobile cameras (e.g. cameras mounted on a vehicle). In some aspects, targeted points or features may be associated with various physical or environmental landmarks, such as limit lines, poles, signs, lane markings, barriers, and so forth. To this end, the detection module 201 may be configured to utilize a variety of object recognition or computer vision algorithms (e.g. machine learning algorithms) to identify pixels in the images that correspond to targeted points or features. In some implementations, the detection module 201 may be configured to use other data, such as LiDAR data, depth data and so forth, to identify the points or features.

In some implementations, the detection module 201 may also be configured to determine perceived locations for points (e.g. ground control points) or features identified in the images. To do so, the detection module 201 receive or access device information. In particular, the detection module 201 may receive or access information about the camera(s) used to acquire the images, such as camera pose (e.g. location and orientation), camera focal length, camera model or type, and so forth. Also, the detection module 201 may receive or access environmental information or attributes under which the imagery is acquired (e.g., weather, time of day, and so on). In addition, the detection module 201 may also receive information about the target points or features, such as coordinates and associated confidences or margins of errors observed using ground surveys, for example. Using such information, the detection module 201 may then determine the perceived locations by projecting one or more rays that emanate from a point in the device or camera used to acquire the images (e.g. a camera center), and extend through pixels in the images that correspond to the selected points. For each projected ray, the detection module 201 may generate a perpendicular that connects to the corresponding target point (e.g. ground control point). The detection module 201 may then determine a perceived location of the target point from the intersection of the projected ray and the perpendicular. The perceived locations may be provided to other modules of the data analysis system 103, as well as other components of the system 100 in FIG. 1, by virtue of a data link, bus or network connected thereto (although not shown in FIG. 2).

As shown in FIG. 2, the data analysis system 103 may also include a training module 203, as shown. The training module 203 may access or receive ground truth image data, and train a machine learning model (e.g. a deep convolutional network, a neural network, a set of equations, rules, decision trees, and so forth) using the data. In some implementations, the training module 203 may be configured to train features for the machine learning model that include pixel information (e.g. pixel correspondences or locations) of the target points (e.g. ground control points) determined in the ground truth images.

Generally, machine learning models are trained to manipulate an input feature set in order to make a prediction about the feature set or the phenomenon/observation that the feature set represents. However, the quality of ground truth data used for training can vary depending on the source, and may lead to uncertainty or error. For example, satellite and aerial source camera sensors can provide imagery with different resolutions. Therefore, in some aspects, the training module 203 may train machine learning models to calculate uncertainties based on the source of data (e.g. camera resolution, camera pose, and so forth).

In some embodiments, the training module 203 can incorporate a supervised learning model (e.g., a logistic regression model, RandomForest model, and/or any equivalent model) to train a machine learning model using the ground truth image data together with the labeled target points (e.g. ground control points). For example, during training, the training module 203 may use a learner module that feeds images and derived feature sets (e.g., pixel correspondences, image attributes, etc.) into the machine learning model to compute a predicted feature set (e.g., predicted target points presented in input images and/or other characteristics of target points) using an initial set of model parameters.

The learner module may then compare the predicted feature set to the ground truth data (e.g., images labeled with known ground point or ground control point pixel locations and/or attributes). For example, the learner module may compute a loss function representing, for instance, an accuracy of the predictions for the initial set of model parameters. In some aspects, the training module 203 may compute a loss function for the training of the machine learning module based on the ground truth images. The learner module of the training module 203 may then incrementally adjust the model parameters until the model minimizes the loss function (e.g., achieves a maximum accuracy with respect to the manually marked labels). In other words, a "trained" prediction model may be a classifier with model parameters adjusted to make accurate predictions with respect to the ground truth data.

Referring again to FIG. 2, the data analysis system 103 may also include a data quality module 205 configured to quantify a quality of data, and identify inadequate or unsuitable data. To this end, the data quality module 205 may receive/access and process a variety of data and information, and provide an indication of the data quality in a report. In some applications, the data analysis system 103 may provide the report in substantially real-time, allowing a user to respond accordingly. For example, the data analysis system 103 may analyze imaging data capturing during a drive, and alert the operator when the imaging data becomes unsuitable for the intended application.

In some implementations, the data quality module 205 may be configured to identify a suitability of one or more images for creating accurate mapping information. In particular, the data quality module 205 may be configured to determine whether one or more images are suitable for creating relatively accurate or absolutely accurate maps. To do so, the data quality module 205 may be configured to perform a comparison between perceived locations of targeted points or features within the field of view of the images, and predetermined locations of the corresponding points or features.

In some aspects, the data analysis system 103 may be configured to quantify the quality of the data by computing pairwise distances between perceived locations and predetermined locations of targeted points or features. Differences between corresponding pairwise distances may then be computed, and aggregated into a relative positioning indicator. For example, the differences may be aggregated using various measures of central tendency, such as a mean, mode, median, and so forth. In some variations, a weighting scheme may be implemented by the data analysis system 103 when computing the relative positioning indicator. For example, certain differences between the pairwise distances may be weighted more, or less, depending on the position, as well as position confidence value, of the corresponding ground control points. In one non-limiting example, the weighting scheme may be based on inverse distance, such as an inverse distance to a camera. This is because the confidence in observing such points tends to change as a function of distance from the point of capture.

If the relative positioning indicator, computed using the image(s) as described above, exceeds a predetermined relative accuracy value or threshold, then a determination may be made by the data analysis system 103 that the image(s) are unsuitable for generating relatively accurate mapping information. And so, using the relative positioning indicator, a confidence in the pose of the device (e.g. camera) can be quantified by deviation of the aggregated difference of distance from the margin of error in observation of the ground control points.

As shown in FIG. 2, the data analysis system 103 may also include a triangulation module 205. The triangulation module 205 may be configured to carry out a triangulation process to estimate coordinates of various targeted points or features. To do so, the triangulation module 205 may determine pixel correspondences between the same target points, for instance, as depicted in multiple images. 3D coordinates (e.g. latitude, longitude, and elevation) of the target points or features may then be estimated from the pixel correspondences and metadata associated with the labeled images. For instance, the triangulation process may utilize a variety of information associated with the camera(s) utilized to acquire the images, such as camera pose, as well as other camera attributes (e.g., camera model, focal length, etc.).

Figure 3:
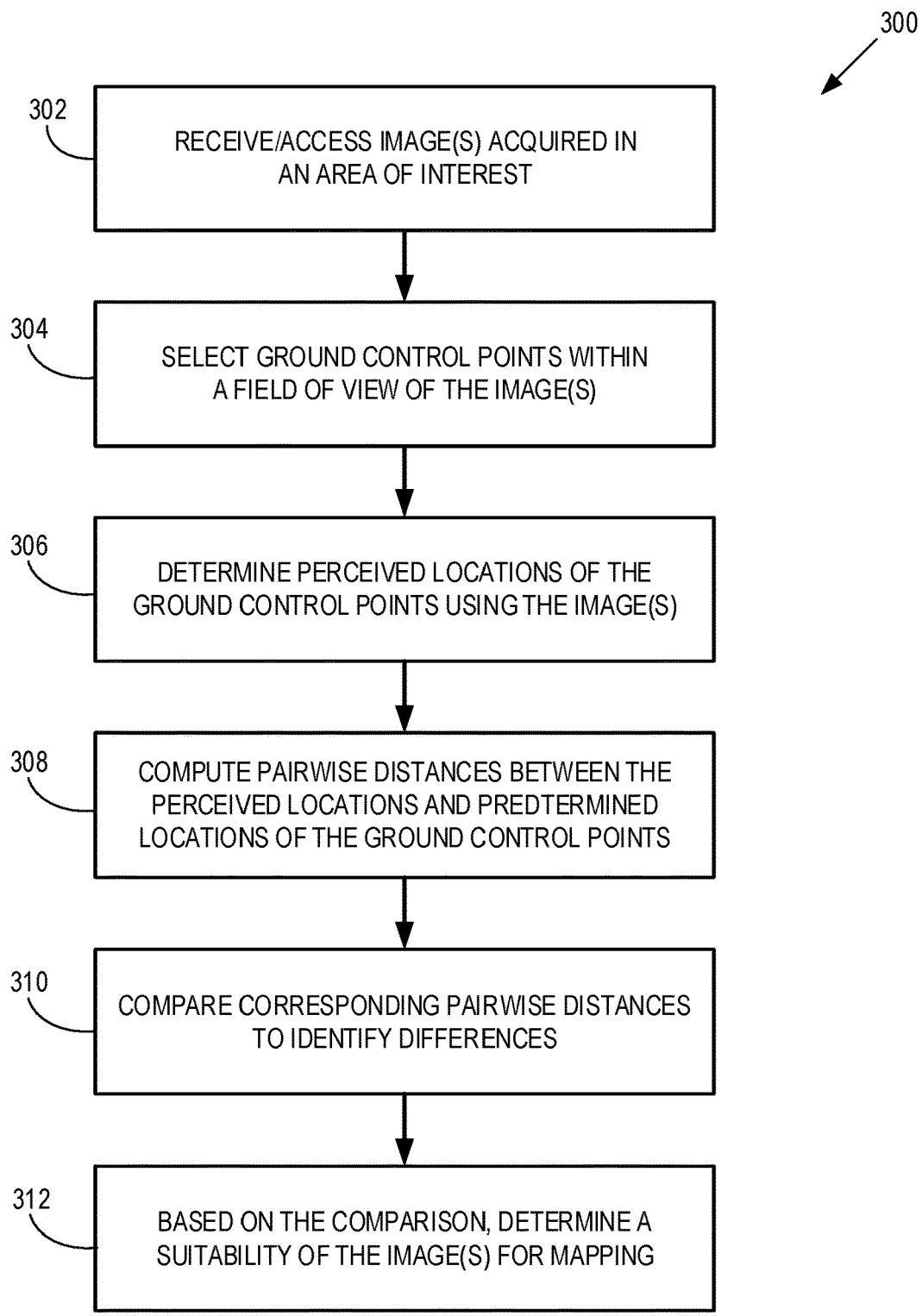
FIG. 3 is a flowchart setting forth steps of a process, in accordance with aspects of the present disclosure.

Turning now to FIG. 3, a flowchart setting forth steps of a process 300, in accordance with aspects of the present disclosure, is illustrated. Steps of the process 300 may be carried out using any combination of suitable devices or systems, as well as using systems described in the present disclosure. In some embodiments, steps of the process 300 may be implemented as instructions stored in non-transitory computer readable media, as a program, firmware or software, and executed by a general-purpose, programmed or programmable computer, processer or other computing device. In other embodiments, steps of the process 300 may be hardwired in an application-specific computer, processer, dedicated system, or module, as described with reference to FIGS. 1 and 2. Although the process 300 is illustrated and described as a sequence of steps, it is contemplated that the steps may be performed in any order or combination, and need not include all of the illustrated steps.

The process 300 may begin at process block 302 with receiving one or more images acquired in an area of interest. The image(s) may be captured in substantially real-time (e.g. by a camera during a drive capture), or accessed from, for example, the geographic database 107, the vehicle 105, or a content provider 111, as described with reference to FIG. 1, as well as from elsewhere (e.g. a memory, server, and so forth).

As indicated by process block 304, ground control points within the field of view the image(s) then be identified and/or selected. In general, ground control points are three-dimensional locations corresponding to certain landmarks on the Earth (e.g. intersections, parts of signs, barriers, buildings, road paint, and so on). They are often measured using various survey techniques, and are used to provide a ground truth or reference information in mapping applications. For instance, ground control points are typically measured by ground surveyors using various high-accuracy instruments (e.g. theodolite, measuring tape, 3D scanners, satellite-based location sensors, levels, rods, and so on).

In identifying/selecting the ground control points at process block 304, a search may be conducted in a list, table or database to identify candidate points. A determination may then be made as to whether the candidate points fulfil certain predetermined criteria, such as having line-of-sight to a camera, being within a preterminal distance from the camera, and other physical or geometrical considerations. In making the determination, a variety of information may be utilized, including the predetermined physical locations (e.g., latitude, longitude, and elevation) of the ground control points, camera information (pose, focal length, model, and so forth), environmental information or attributes under which the imagery is acquired (e.g., weather, time of day, and so on), and so forth. In some aspects, it may also be advantageous to identify/select ground control points that correspond to landmarks or objects that enable both lateral and longitudinal localization. For examples, limit lines, poles and signs contribute to longitudinal localization. Lane markings and barriers contribute to lateral localization. Other examples are possible.

Then, at process block 306, the perceived locations of the identified/selected ground control points may be determined using the image(s). To do so, various object recognition or computer vision algorithms (e.g. machine learning algorithms) may be utilized to identify pixels in the image(s) that correspond to the ground control points. The perceived locations may then be determined by projecting one or more rays that emanate from a point in the device or camera used to acquire the image(s) (e.g. a camera center), and extend through pixels in the image(s) that correspond to the ground control points. For each projected ray, a perpendicular that connects to the corresponding ground control point is generated. The perceived location of each ground control point is then determined from the intersection of the projected ray and the perpendicular. To note, although rays and perpendiculars are generated in this computation, a visual representation need not be created or rendered.

Figure 4:
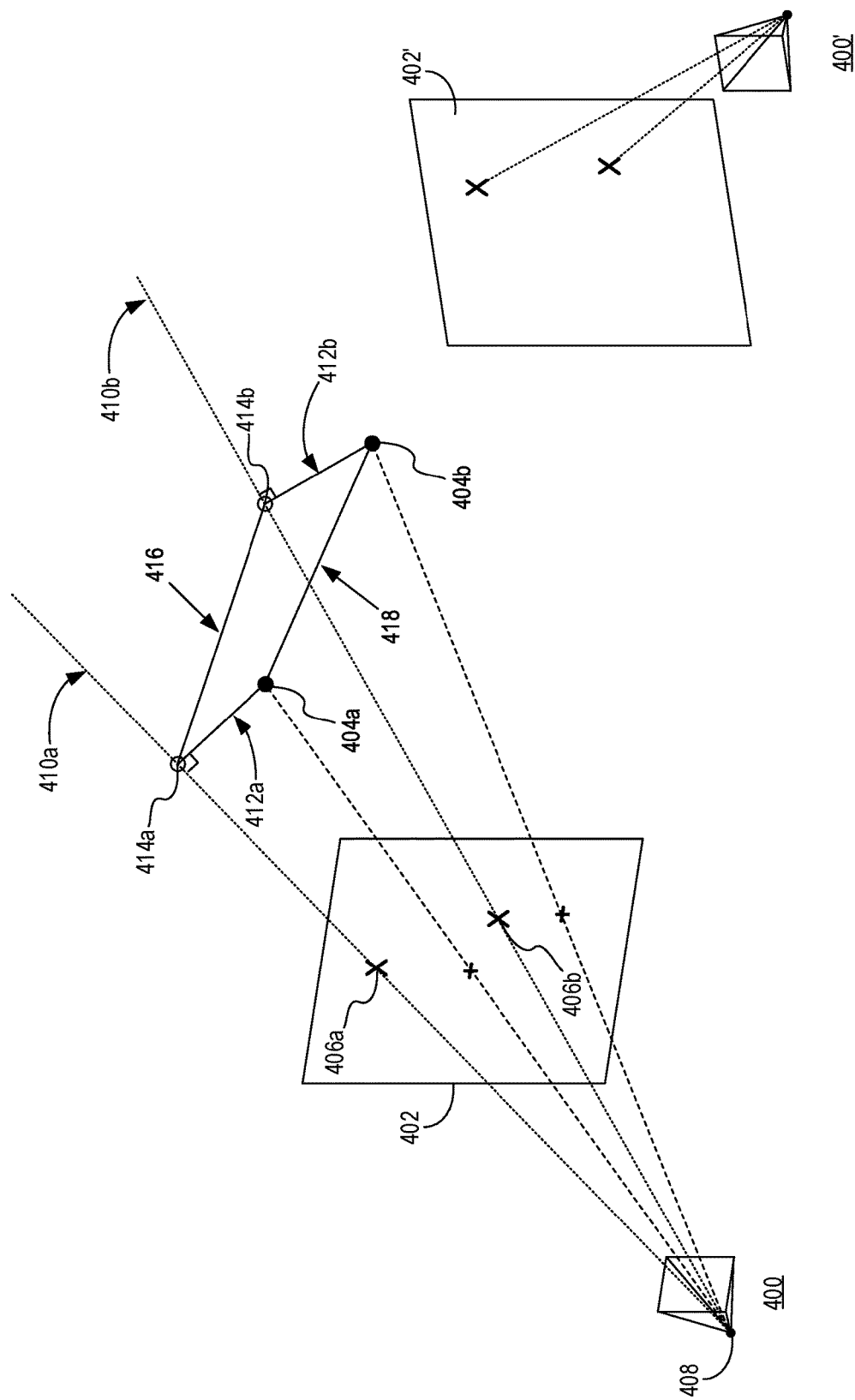
FIG. 4 is a schematic that illustrates steps of the process shown in FIG. 3.

To illustrate this step, a non-limiting example is shown in FIG. 4. In the figure, a device (e.g. a camera) having a pose 400 (i.e. a position and orientation) is arranged to capture an image 402 depicting a first ground control point 404a and a second ground control point 404b. The locations of the ground control points may be predetermined (e.g. using a survey), and satisfy the criteria for being visible in the image 402. In analyzing the image 402 (using various object recognition or machine learning algorithm), the one or more pixels that correspond to each of the ground control points 404a,b are detected. In the figure, pixel(s) 406a correspond(s) to the first ground control point 404a, and pixel(s) 406b correspond(s) to the second ground control point 404b, respectively.

To determine the perceived locations of the ground control points 404a,b, rays may be extended from a point 408 in the device (e.g. a camera center) through the corresponding pixels. Referring again to the figure, a first ray 410a extends from the point 408 through the first pixel(s) 406a, and a second ray 410b extends from the point 408 through the second pixel(s) 406b. By extending a first perpendicular 412a to the first ray 410 that connects with the first ground control point 404a, the first perceived location 414a of the first ground control point 404 may be determined. Similarly, the intersection of the second ray 410b with a second perpendicular 412b that connects to the second ground control point 404b determines a second perceived location 414b of the second ground control point 404b. In some aspects, confidence values may also be computed for the perceived locations 414a,b. To note, multiple images of the same area are often captured and from a variety of perspectives. As such, the device (or another device) may have a different pose 400' and capture a different image 402' depicting the ground control points 404a,b, as shown in FIG. 4, and a similar process may be performed.

Referring again to FIG. 3, pairwise distances between the perceived locations of the ground control points may then be computed at process block 308. In some aspects, pairwise distances between the ground control points may also be computed using their predetermined locations, although the distances may also be predetermined. In the example of FIG. 4, the perceived distance 416 between the first and second ground control points 404a,b is computed using the first and the second perceived locations 414a,b. The actual distance 418 is based on the predetermined locations of the first and second ground control points 404a,b.

As indicated by process block 310, a comparison may then be made between corresponding pairwise distances in order to identify differences. Referring again to the example in FIG. 4, the difference between the perceived distance 416 and the actual distance 418 reflects the discrepancy between the apparent (i.e. imaged) and the measured distance (e.g. as assessed using a survey). Of course, more than two ground control points may be imaged. In such cases, pairwise distances between all combinations of ground control points may be computed based on the perceived and predetermined locations. The differences in the corresponding distances may then be aggregated by computing a relative positioning indicator. The relative positioning indicator may be computed based on various measures of central tendency, such as a mean, mode, median, and so forth. As described, a weighting scheme may be used to compute the relative positioning indicator.

Based on the comparison, a suitability of the image(s) for mapping is determined, as indicated by process block 312. The determination can be based on whether one or more differences between corresponding pairwise differences exceeds a threshold, or whether the relative positioning indicator exceeds a predetermined relative accuracy value or threshold. As an example, the relative accuracy value or threshold may be determined based on the uncertainty or the margin of error for observing the predetermined locations of the ground control points. If the differences or relative positioning indicator exceeds the predetermined relative accuracy value or threshold, the image(s) may be deemed unsuitable or inadequate for generating relatively accurate mapping information.

In some aspects, a report may be generated and provided at process block 312. The report may be in any form, and provide various information. In some implementations, the report may be in the form of visual and/or audio signals, images, tabulated information and data, instructions, and combinations thereof. The report may be communicated to a user or operator by way of a display, speakers, or other means of output, or transmitted to various devices or systems for further steps, analysis or processing. In some aspects, the report may be provided in real-time (e.g. substantially as data is being captured). The report, and various data and information therein, may also be stored (e.g. in a memory, a database, a server, and so forth). in the report may be used to indicate inadequate data, or a suitability for a particular application. The report may further provide an indication to a user, such as instructions for repeating a measurement or acquisition.

In some aspects, the report may provide a value for a computed relative positioning indicator. The report may also provide information (e.g. locations or 3D coordinates, uncertainties, and so forth) associated with ground control points identified in the area of interest, as well as those that satisfy the criteria for visibility. The report may further provide information associated with ground control points selected for analysis, in accordance with process 300. In some aspects, data and information provided.

Figure 5:
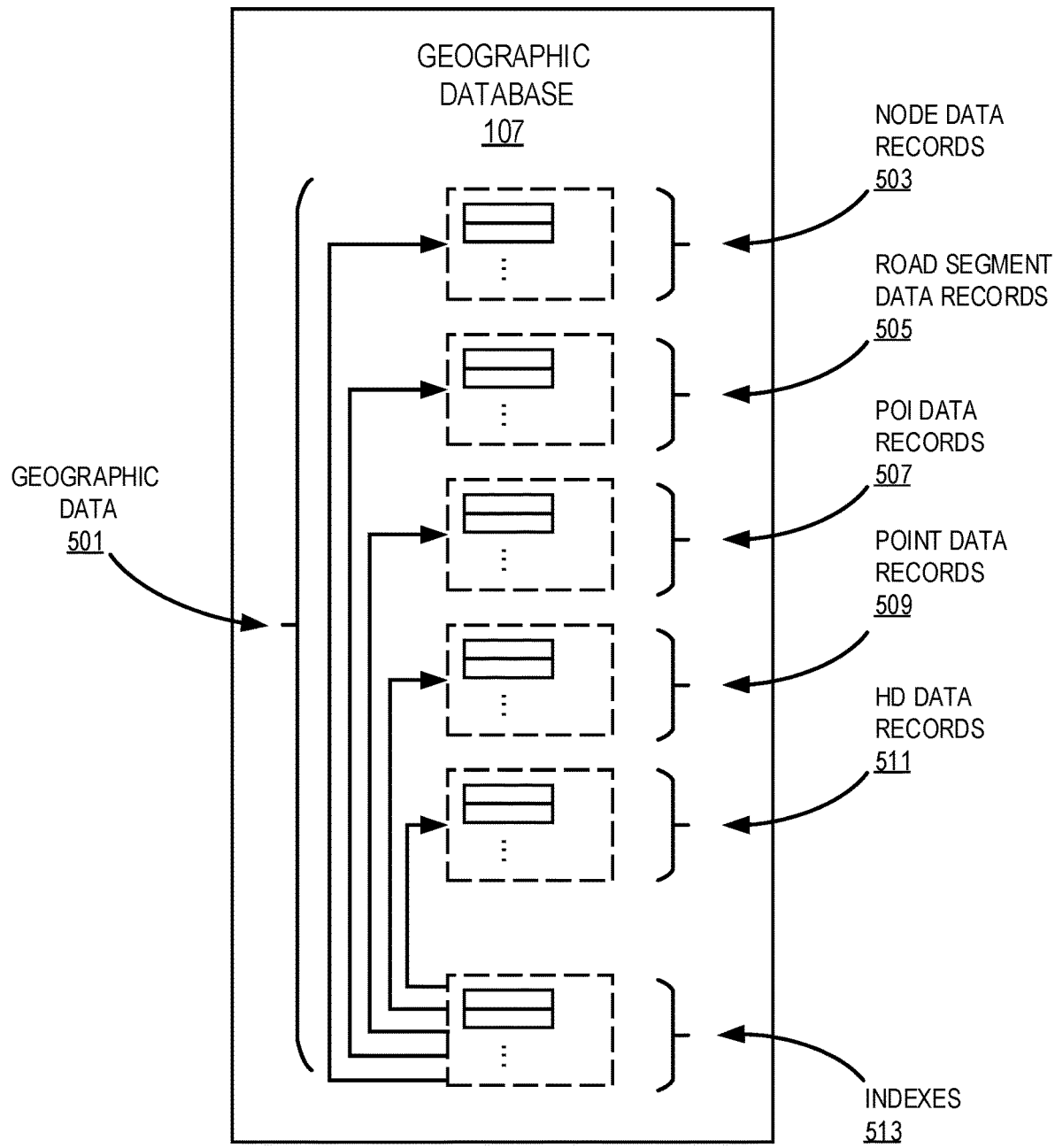
FIG. 5 is a diagram of an example geographic database, in accordance with aspects of the present disclosure.

Turning now to FIG. 5, a diagram of a geographic database 107, according to aspects of the present disclosure, is shown. As shown, the geographic database 107 may include a variety of geographic data 501 tabulated in various arrangements, and used in various applications. For example, the geographic data 501 may be used for (or configured to be compiled to be used for) mapping and/or navigation-related services. As shown in FIG. 1, the geographic data 501 may include node data records 503, road segment data records 505, point of interest (POI) data records 507, point data records 509, high definition (HD) mapping data records 511, and indexes 513, for example. The geographic data 501 may include more, fewer or different data records. In some embodiments, additional data records not shown in FIG. 5 may also be included, such as cartographic ("carto") data records, routing data records, maneuver data records, and other data records.

In particular, the HD mapping data records 511 may include a variety of data, including data with resolution sufficient to provide centimeter-level or better accuracy of map features. For example, the HD mapping data may include data captured using LiDAR, or equivalent technology capable large numbers of 3D points, and modelling road surfaces and other map features down to the number lanes and their widths. In one embodiment, the HD mapping data (e.g., HD data records 511) capture and store details such as the slope and curvature of the road, lane markings, roadside objects such as sign posts, including what the signage denotes. By way of example, the HD mapping data enable highly automated vehicles to precisely localize themselves on the road.

In some implementations, geographic features (e.g., two-dimensional or three-dimensional points/features) may be represented in the geographic database 107 using polygons (e.g., two-dimensional features) or polygon extrusions (e.g., three-dimensional points/features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107:

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In some implementations, certain conventions or rules may be followed in the geographic database 107. For example, links may not cross themselves or each other except at a node. In another example, shape points, nodes, or links may not be duplicated. In yet another example, two links that connect each other may have a common node. In the geographic database 107, overlapping geographic features are represented by overlapping polygons. When polygons overlap, the boundary of one polygon crosses the boundary of the other polygon.

In the geographic database 107, the location at which the boundary of one polygon intersects the boundary of another polygon may be represented by a node. In one embodiment, a node may be used to represent other locations along the boundary of a polygon than a location at which the boundary of the polygon intersects the boundary of another polygon. In one embodiment, a shape point may not be used to represent a point at which the boundary of a polygon intersects the boundary of another polygon.

In exemplary embodiments, the road segment data records 505 may be links or segments representing roads, streets, or paths, as can be used in the calculated route or recorded route information for determination of one or more personalized routes. The node data records 503 may be end points corresponding to the respective links or segments of the road segment data records 505. The road link data records 505 and the node data records 503 may represent a road network, as used by vehicles, cars, and/or other entities, for instance. Alternatively, the geographic database 107 may contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 505 can include data about the POIs and their respective locations in the POI data records 507. The geographic database 107 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

As shown in FIG. 5, the geographic database 107 may also include point data records 509 for storing the point data (e.g. ground control points), map features, as well as other related data used according to the various embodiments described herein. In addition, the point data records 509 can also store ground truth training and evaluation data, machine learning models, annotated observations, and/or any other data. By way of example, the point data records 509 can be associated with one or more of the node records 503, road segment records 505, and/or POI data records 507 to support localization or visual odometry based on the features stored therein and the corresponding estimated quality of the features. In this way, the records 509 can also be associated with or used to classify the characteristics or metadata of the corresponding records 503, 505, and/or 507.

The HD mapping data records 511 may models of road surfaces and other map features to centimeter-level or better accuracy. The HD mapping data records 511 may also include models that provide the precise lane geometry with lane boundaries, as well as rich attributes of the lane models. These rich attributes may include, but are not limited to, lane traversal information, lane types, lane marking types, lane level speed limit information, and/or the like. In one embodiment, the HD mapping data records 511 may be divided into spatial partitions of varying sizes to provide HD mapping data to vehicles and other end user devices with near real-time speed without overloading the available resources of these vehicles and devices (e.g., computational, memory, bandwidth, etc. resources).

The HD mapping data records 511 may be created from high-resolution 3D mesh or point-cloud data generated, for instance, from LiDAR-equipped vehicles. The 3D mesh or point-cloud data may be processed to create 3D representations of a street or geographic environment at centimeter-level accuracy for storage in the HD mapping data records 511. In some embodiments, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

The geographic database 107 may be maintained by content provider in association with a services platform (e.g., a map developer), as described with reference to FIG. 1. The map developer can collect geographic data to generate and enhance the geographic database 107. The data may be collected in various ways by the map developer, including obtaining data from other sources, such as municipalities or respective geographic authorities. In addition, the map developer can employ field personnel to travel by vehicle along roads throughout the geographic area of interest to observe features and/or record information about them, for example. Also, remote sensing, such as aerial or satellite photography, can be used.

In some implementations, the geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device of a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The indexes 513 in FIG. 5 may be used improve the speed of data retrieval operations in the geographic database 107. Specifically, the indexes 513 may be used to quickly locate data without having to search every row in the geographic database 107 every time it is accessed. For example, in one embodiment, the indexes 513 can be a spatial index of the polygon points associated with stored feature polygons.

Figure 6:
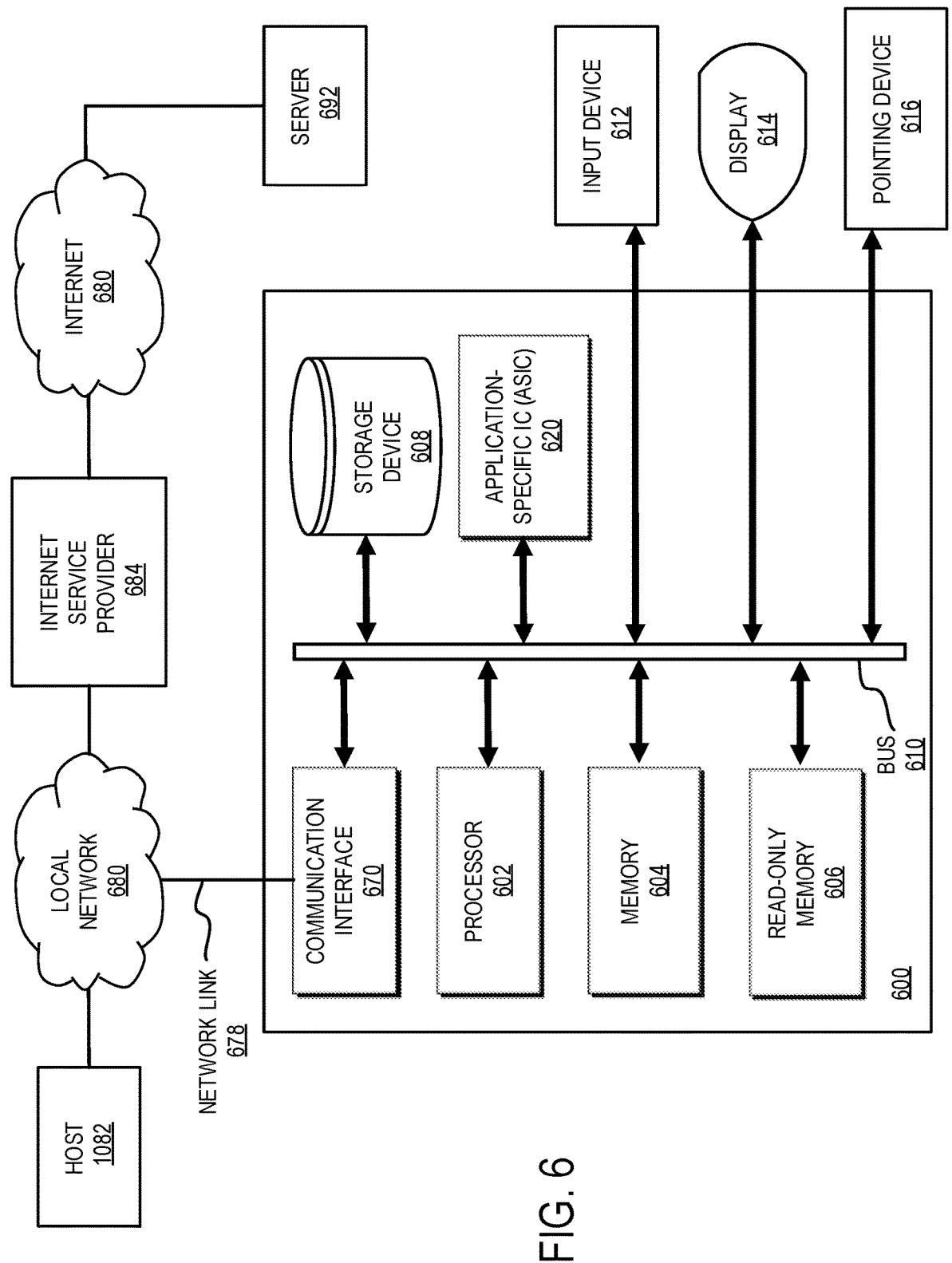
FIG. 6 is a diagram of an example computer system, in accordance with aspects of the present disclosure.

An example computer system 600, in accordance with aspects of the present disclosure, is illustrated in FIG. 6. The computer system 600 may be programmed (e.g., via computer program code or instructions) to perform a variety of steps, including steps for determining a suitability or adequacy of data, as described above.

As shown in FIG. 6, the computer system 600 may generally include a processor 602, which may be configured to perform a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). In some aspects, the set of operations may include bringing information in from a bus 610 and placing information on the bus 610. The set of operations may also include comparing two or more units of information, shifting positions of units of information, and combining two or more units of information, such as by addition or multiplication or logical operations like OR, exclusive OR (XOR), and AND. Each operation of the set of operations performed by the processor 602 may be represented to the processor 602 by information called instructions, such as an operation code of one or more digits. The sequence of operations to be executed by the processor 602, such as a sequence of operation codes, constitute processor 602 instructions, may also be called computer system 600 instructions or, simply, computer instructions. The processor 602 may include multiple processors, units or modules, and may be implemented as mechanical, electrical, magnetic, optical, chemical or quantum components, among others, or any combination thereof.

As shown in FIG. 6, the computer system 600 may also include a memory 604 coupled to bus 610. The memory 604, such as a random-access memory (RAM) or other dynamic storage device, may be configured to store a variety of information and data, including processor instructions for carrying steps in accordance with aspects of the disclosure. Dynamic memory allows information stored therein to be changed by the computer system 600. The RAM allows a unit of information stored at a location called a memory address to be stored and retrieved independently of information at neighboring addresses. The memory 604 may also be used by the processor 602 to store temporary values during execution of processor instructions.

The computer system 600 may also include a read-only memory (ROM) 606, or other static storage device, coupled to the bus 610. The ROM 606 may be configured for storing static information, including instructions, that is not changed by the computer system 600. Some memory 604 includes volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

As mentioned, the bus 610 may be configured for passing information and data between internal and external components of the computer system 600. To do so, the bus 610 may include one or more parallel conductors that facilitate quick transfer of information and data among the components coupled to the bus 610. The information and data may be represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, may represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, analog data may be represented by a near continuum of measurable values within a particular range.

Information, including instructions for determining a suitability or adequacy of data, may be provided to the bus 610 for use by the processor 602 from an external input device 612, such as a keyboard or a sensor. The sensor may be configured to detect conditions in its vicinity and transform those detections into physical expression compatible with the measurable phenomenon used to represent information in computer system 600. Other external devices coupled to bus 610, used primarily for interacting with humans, may include a display device 614, such as a cathode ray tube (CRT) or a liquid crystal display (LCD), or plasma screen or printer for presenting text or images, as well as a pointing device 616 (e.g. a mouse, trackball, cursor direction keys, motion sensor, etc) for controlling a position of a small cursor image presented on the display 614 and issuing commands associated with graphical elements presented on the display 614. In some embodiments, for example, the computer system 600 performs all functions automatically without human input. As such, one or more of external input device 612, display device 614 and pointing device 616 may be omitted.

As shown in FIG. 6, special purpose hardware, such as an application specific integrated circuit (ASIC) 620, may be coupled to bus 610. The special purpose hardware may be configured to perform specialized operations. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 may also include one or more instances of a communications interface 670 coupled to bus 610. The communication interface 670 may provide a one-way or two-way communication coupling to a variety of external devices that operate with their own processors, such as printers, scanners and external disks. In addition, the communication interface 670 may provide a coupling to a local network 680, by way of a network link 678. The local network 680 may provide access to a variety of external devices and systems, each having their own processors and other hardware, as shown in FIG. 6.

By way of example, the communication interface 670 may include a parallel port or a serial port or a universal serial bus (USB) port on a personal computer. In some embodiments, the communications interface 670 may include one or more integrated services digital network (ISDN) cards, or digital subscriber line (DSL) cards, or telephone modems that provides an information communication connection to a corresponding type of telephone line. In some embodiments, the communication interface 670 may include a cable modem that converts signals on bus 610 into signals for a communication connection over a coaxial cable or into optical signals for a communication connection over a fiber optic cable. As another example, the communications interface 670 may be a local area network (LAN) card configured to provide a data communication connection to a compatible LAN, such as Ethernet. Wireless links may also be implemented. For wireless links, the communications interface 670 may send and/or receive electrical, acoustic or electromagnetic signals, including infrared and optical signals, that carry information streams, including digital data. For example, in wireless handheld devices (e.g. mobile telephones, cell phones, and so forth), the communications interface 670 may include a radio band electromagnetic transmitter and receiver called a radio transceiver. In certain embodiments, the communications interface 670 enables connection to the communication network, as described with reference to FIG. 1.

As used herein, computer-readable media refers to any media that participates in providing information to processor 602, including instructions for execution. Such media may take many forms, and include non-volatile media, volatile media, transmission media, and others. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 7:
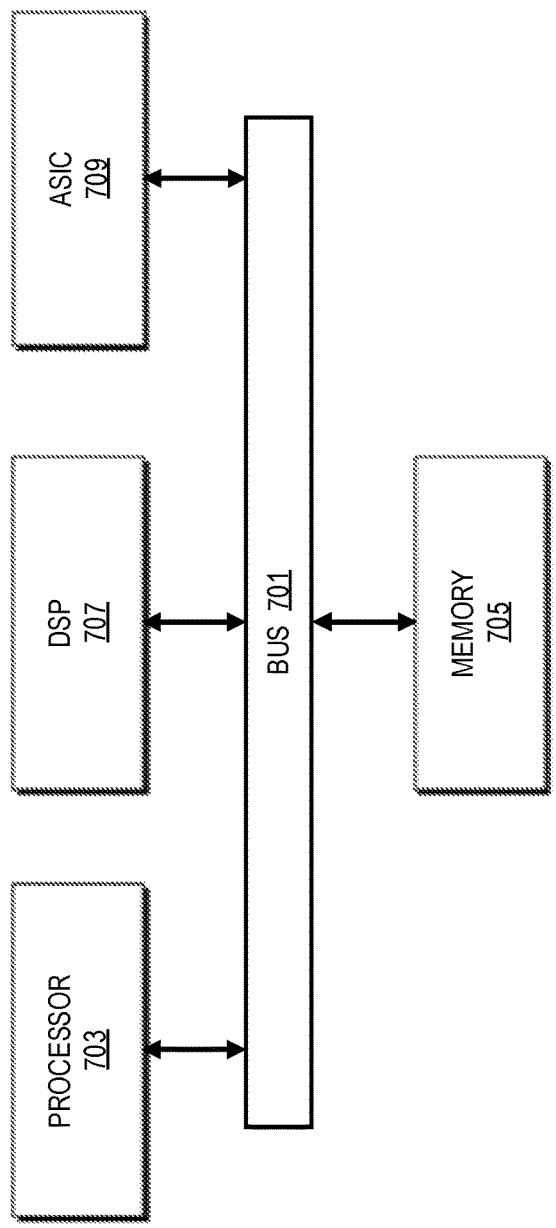
FIG. 7 is a diagram of an example chip set, in accordance with aspects of the present disclosure.

Turning now to FIG. 7, a chip set 700, in accordance with aspects of the present disclosure, is illustrated. In some implementations, the chip set 700 may be programmed to carry out steps in accordance with methods described herein, and may include various components (e.g. as described with respect to FIG. 6) incorporated in one or more physical packages (e.g., chips). By way of example, a physical package includes an arrangement of one or more materials, components, and/or wires on a structural assembly (e.g., a baseboard) that provides one or more characteristics, such as physical strength, conservation of size, and/or limitation of electrical interaction. It is contemplated that in certain embodiments the chip set 700 can be implemented in a single chip.

As shown, the chip set 700 may include a communication mechanism, such as a bus 701 for passing information and data among the components of the chip set 1100. A processor 703 connected to the bus 701 may be configured to execute instructions and process information stored in, for example, a memory 705. The processor 703 may include one or more processing cores, with each core capable of performing independently. In some implementations, a multi-core processor may be used, which enables multiprocessing within a single physical package. Examples of a multi-core processor include two, four, eight, or greater numbers of processing cores. Alternatively, or additionally, the processor 703 may include one or more microprocessors configured in tandem, via the bus 701, to perform independent execution of instructions, pipelining, and multithreading.

The chip set 700 may also include specialized components configured to perform certain processing functions and tasks. For instance, the chip set 700 may include one or more digital signal processors (DSP) 707, or one or more application-specific integrated circuits (ASIC) 709, or both. In particular, the DSP 707 may be configured to process real-world signals (e.g., sound) in real-time independently of the processor 703. Similarly, the ASIC 709 may be configured to performed specialized functions not easily performed by a general-purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components may have connectivity to the memory 705 via the bus 701, as shown. The memory 705 may include dynamic memory (e.g., RAM, magnetic disk, writable optical disk, etc.), static memory (e.g., ROM, CD-ROM, etc.), and others, configured for storing executable instructions. The instructions, when executed, perform a variety of steps, including steps for identifying the quality of terrestrial data, in accordance with methods described herein. The memory 705 may also store the data associated with or generated by the execution.

Figure 8:
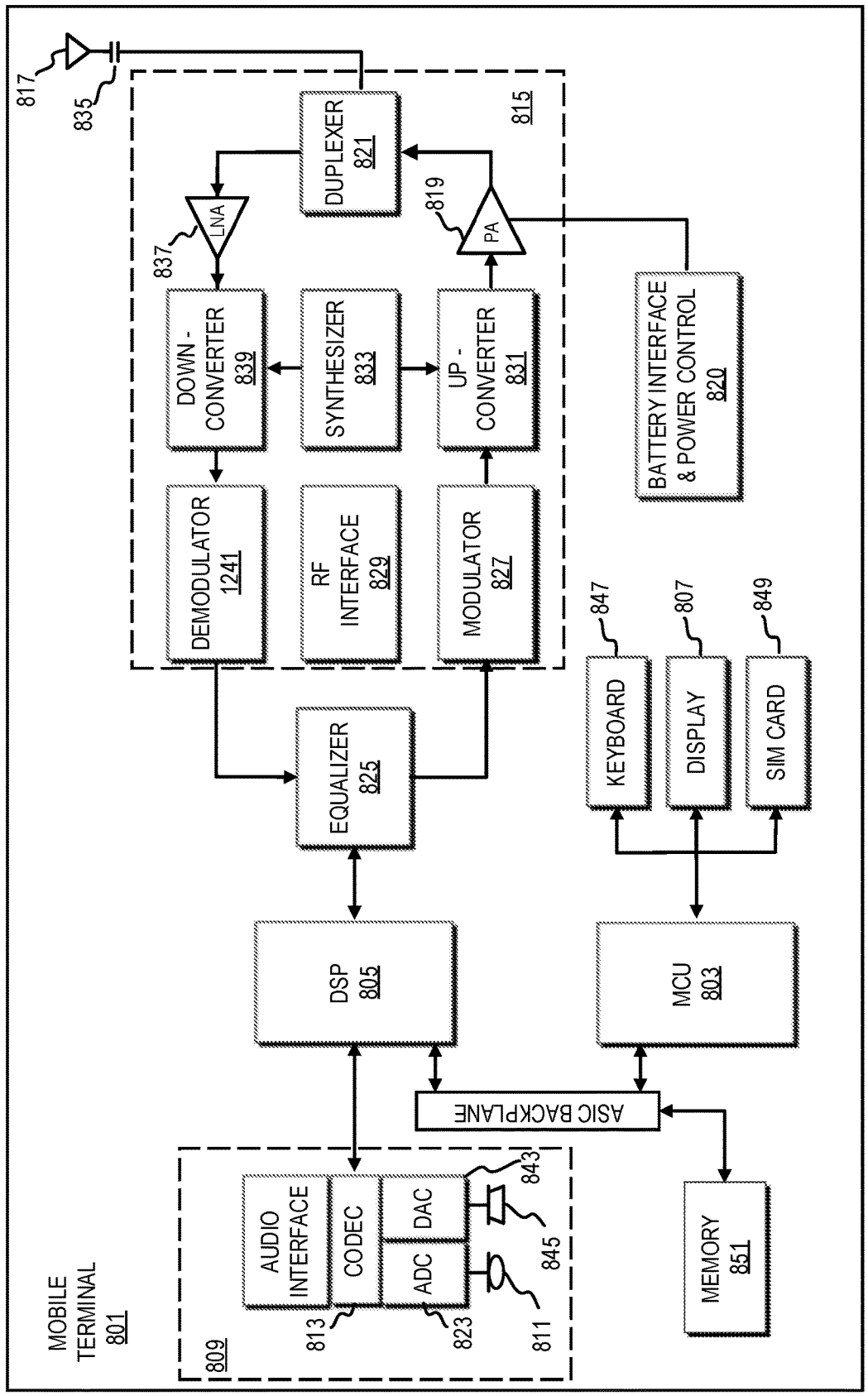
FIG. 8 is a diagram of an example mobile terminal, in accordance with aspects of the present disclosure.

Turning now to FIG. 8, a diagram of example mobile terminal 801, in accordance with aspects of the disclosure, is shown. In some implementations, the mobile terminal 810 may be an embedded component of the vehicle 105 or UE 109, as described with reference to FIG. 1.

In general, the mobile terminal 801 may include a Main Control Unit (MCU) 803, a Digital Signal Processor (DSP) 805, and a receiver/transmitter unit including a microphone gain control unit and a speaker gain control unit. A display 807 provides feedback to user in support of various applications and functions of the mobile terminal 801. The mobile terminal 801 may also include audio function circuitry 809, including a microphone 811 and microphone amplifier that amplifies the sound signal output from the microphone 811. The amplified sound signal output from the microphone 811 is fed to a coder/decoder (CODEC) 813.

The mobile terminal 801 may also include a radio section 815, which amplifies power and converts frequency in order to communicate with a base station, which is included in a mobile communication system, via antenna 817. Generally, a radio receiver is often defined in terms of front-end and back-end characteristics. The front-end of the receiver encompasses all of the Radio Frequency (RF) circuitry whereas the back-end encompasses all of the base-band processing circuitry. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The MCU 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to determine ground control points from image data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 may include the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory 851 may be, but not is limited to, a single memory, CD, DVD, ROM, RAM, EEPROM, optical storage, or any other non-volatile or non-transitory storage medium capable of storing digital data.

An optionally incorporated SIM card 849 may carry, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. It should be appreciated that many equivalents, alternatives, variations, and modifications, aside from those expressly stated, are possible and may be considered within the scope of the invention.

The invention claimed is:

1. A method for identifying data suitable for mapping, the method comprising:
   receiving one or more images acquired in an area of interest;
   selecting at least two ground control points within a field of view of the one or more images;
   determining perceived locations for the at least two ground control points using the one or more images;
   computing pairwise distances between the perceived locations and predetermined locations of the at least two ground control points;
   comparing corresponding pairwise distances to identify differences therebetween; and
   determining a suitability of the one or more images for mapping based on the comparison.

2. The method of claim 1, wherein the method further comprises identifying ground control points in the area of interest that satisfy predetermined criteria.

3. The method of claim 1, wherein the method further comprises calculating an uncertainty for the perceived locations using device information and environmental information associated with the one or more images.

4. The method of claim 1, wherein the method further comprises calculating a relative positioning indicator using the differences identified.

5. The method of claim 4, wherein the method further comprises calculating the relative positioning indicator based on a central tendency of the differences.

6. The method of claim 4, wherein the method further comprises using a weighting scheme based on inverse distance to calculate the relative positioning indicator.

7. The method of claim 4, wherein the method further comprises determining the suitability by comparing the relative positioning indicator to a predetermined relative accuracy value.

8. The method of claim 1, wherein the method further comprises identifying a pose for a device used to acquire the one or more images.

9. The method of claim 8, wherein determining the perceived locations further comprises:
   identifying pixel locations in the one or more images corresponding to the at least two ground control points;
   for each of the at least two ground control points, projecting a ray that originates in a center of the device and passes through corresponding pixel locations;
   generating a perpendicular for each ray, wherein each perpendicular connects to a corresponding ground control point; and
   determining a perceived location of each ground control point using the respective perpendicular.

10. The method of claim 9, wherein the method further comprises utilizing a machine learning algorithm to identify the pixel locations.

11. A system for identifying data suitable for mapping, the system comprising:
   at least one processor;
   at least one memory comprising instructions executable by the at least one processor, the instructions causing the system to:
      receive one or more images acquired in an area of interest;
      select at least two ground control points within a field of view of the one or more images;
      determine perceived locations for the at least two ground control points using the one or more images;
      compute pairwise distances between the perceived locations and predetermined locations of the at least two ground control points;
      compare corresponding pairwise distances to identify differences therebetween; and
      generate a report indicating a suitability of the one or more images for mapping that is determined based on the comparison; and
   a display for providing the report to a user.

12. The system of claim 11, wherein the instructions further cause the system to identify ground control points in the area of interest that satisfy predetermined criteria.

13. The system of claim 11, wherein the instructions further cause the system to identify a pose for a device used to acquire the one or more images.

14. The system of claim 13, wherein the instructions further cause the system to determine the perceived locations by:
   identifying pixel locations in the one or more images corresponding to the at least two ground control points;
   for each of the at least two ground control points, projecting a ray that originates in a center of the device and passes through corresponding pixel locations;
   generating a perpendicular for each ray, wherein each perpendicular connects to a corresponding ground control point; and determining a perceived location of each ground control point using the respective perpendicular.

15. The system of claim 11, wherein the instructions further cause the system to calculate an uncertainty for the perceived locations using device information and environmental information associated with the one or more images.

16. The system of claim 11, wherein the instructions further cause the system to calculate a relative positioning indicator using the differences identified.

17. The system of claim 16, wherein the instructions further cause the system to calculate the relative positioning indicator based on a central tendency of the differences.

18. The system of claim 16, wherein the instructions further cause the system to use a weighting scheme based on inverse distance to calculate the relative positioning indicator.

19. The system of claim 16, wherein the instructions further cause the system to determine the suitability by comparing the relative positioning indicator to a predetermined relative accuracy value.

20. A non-transitory computer-readable storage medium for identifying data suitable for mapping, carrying one or more sequences of one or more instructions which, when executed by one or more processors, cause an apparatus to perform steps to:

receive one or more images acquired in an area of interest;

select at least two ground control points within a field of view of the one or more images;

determine perceived locations for the at least two ground control points using the one or more images;

compute pairwise distances between the perceived locations and predetermined locations of the at least two ground control points;

compare corresponding pairwise distances to identify differences therebetween; and determine a suitability of the one or more images for mapping based on the comparison.

* * * * *